(12) United States Patent
Kirkwood

(10) Patent No.: US 6,810,460 B1
(45) Date of Patent: Oct. 26, 2004

(54) AMBA BUS OFF-CHIP BRIDGE

(75) Inventor: Matthew D. Kirkwood, West St. Paul, MN (US)

(73) Assignee: LSI Logic Corporation, Milpitas, CA (US)

(*) Notice: Subject to any disclaimer, the term of this patent is extended or adjusted under 35 U.S.C. 154(b) by 567 days.

(21) Appl. No.: 09/784,587

(22) Filed: Feb. 15, 2001

(51) Int. Cl.[7] .......................................... G06F 13/100
(52) U.S. Cl. ................................ 710/306; 710/124
(58) Field of Search .................. 710/306, 124; 713/501

(56) References Cited

U.S. PATENT DOCUMENTS

| | | | | |
|---|---|---|---|---|
| 5,734,877 A | * | 3/1998 | Ries et al. | 713/500 |
| 5,909,563 A | * | 6/1999 | Jacobs | 710/305 |
| 6,079,027 A | * | 6/2000 | Lai et al. | 713/501 |
| 6,202,167 B1 | * | 3/2001 | Lai et al. | 713/501 |
| 6,247,082 B1 | * | 6/2001 | Lo et al. | 710/105 |
| 6,366,973 B1 | * | 4/2002 | Lo et al. | 710/306 |
| 6,425,071 B1 | * | 7/2002 | Lo et al. | 712/41 |
| 6,442,642 B1 | * | 8/2002 | Brooks | 710/305 |
| 6,467,010 B1 | * | 10/2002 | Pontius et al. | 710/305 |
| 6,535,018 B1 | * | 3/2003 | Kost | 326/68 |
| 6,571,308 B1 | * | 5/2003 | Reiss et al. | 710/315 |
| 6,633,994 B1 | * | 10/2003 | Hofmann et al. | 713/600 |

OTHER PUBLICATIONS

AMBA Specification(Rev 2.0), ARM Limited, 1999.*

* cited by examiner

*Primary Examiner*—Glenn A. Auve
*Assistant Examiner*—Nimesh Patel
(74) *Attorney, Agent, or Firm*—Conley, Rose & Tayon

(57) ABSTRACT

An application specific integrated circuit, ASIC, having an advanced high-speed bus, AHB, operating in Advanced Microcontroller Bus Architecture, AMBA, and a bridge for connecting to an off-chip device is disclosed. The bridge includes a logical section and a buffer section for modifying AMBA signals to accommodate the differing clock speeds, voltages and signals required by the off-chip device. The logic section includes clock division and registers to store variables identifying the off-chip device and data being transferred from the AHB to the off-chip device. The buffer section provides any conversion of signal voltage levels between the core ASIC voltages and the input/output voltages required by the off-chip device.

3 Claims, 4 Drawing Sheets

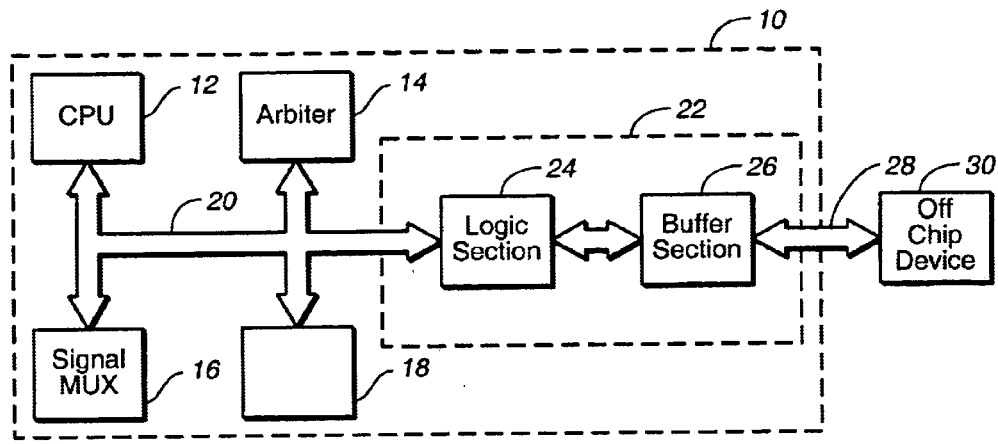
FIG._1
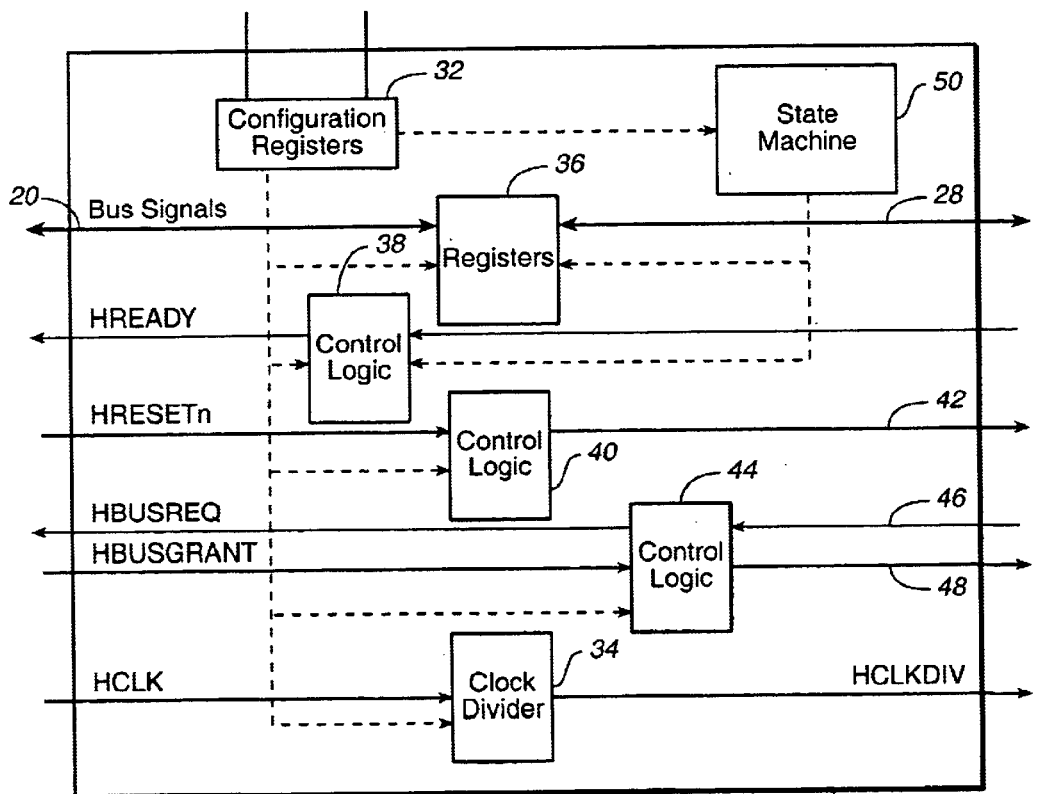
FIG._2

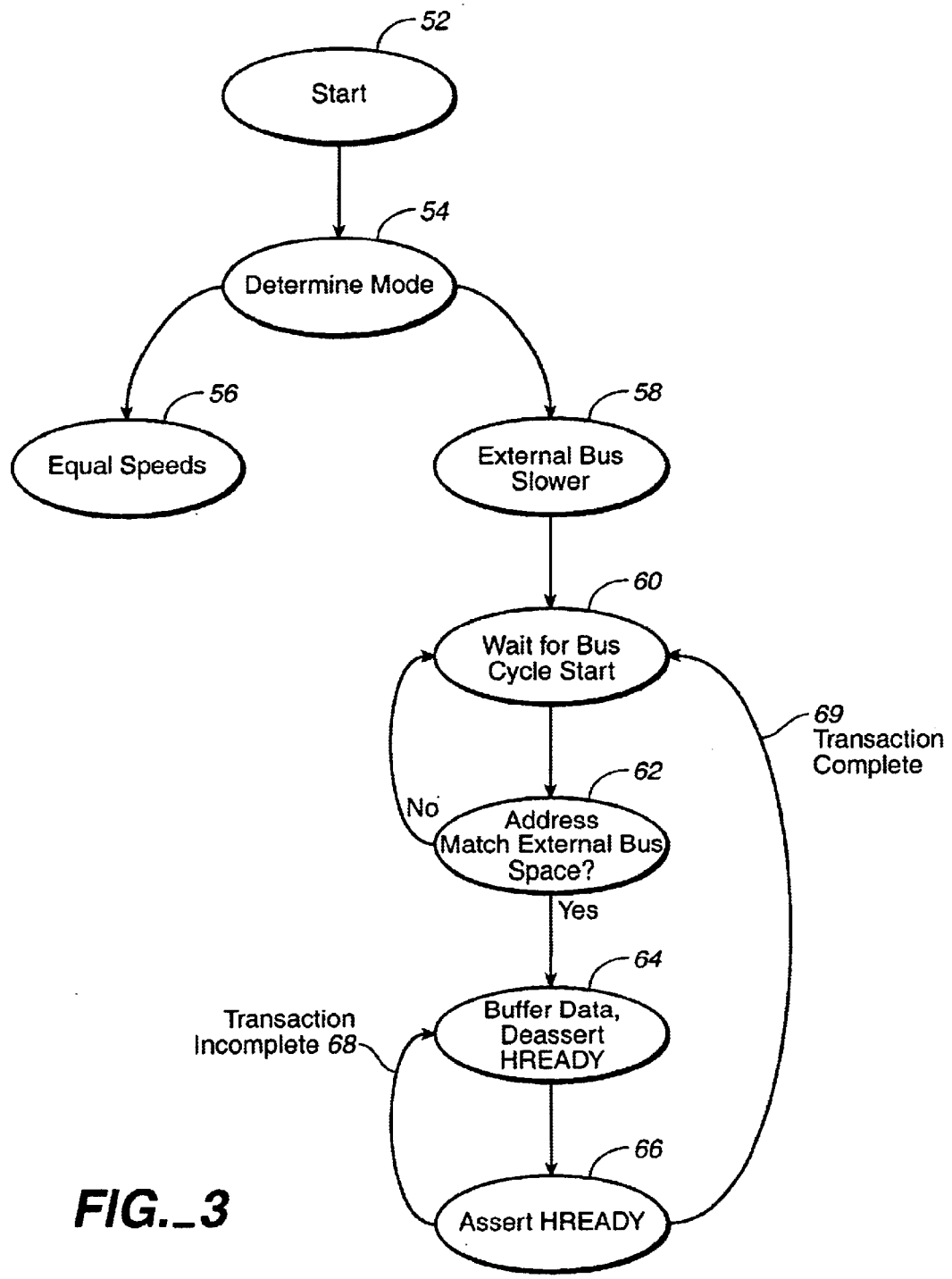
FIG._3

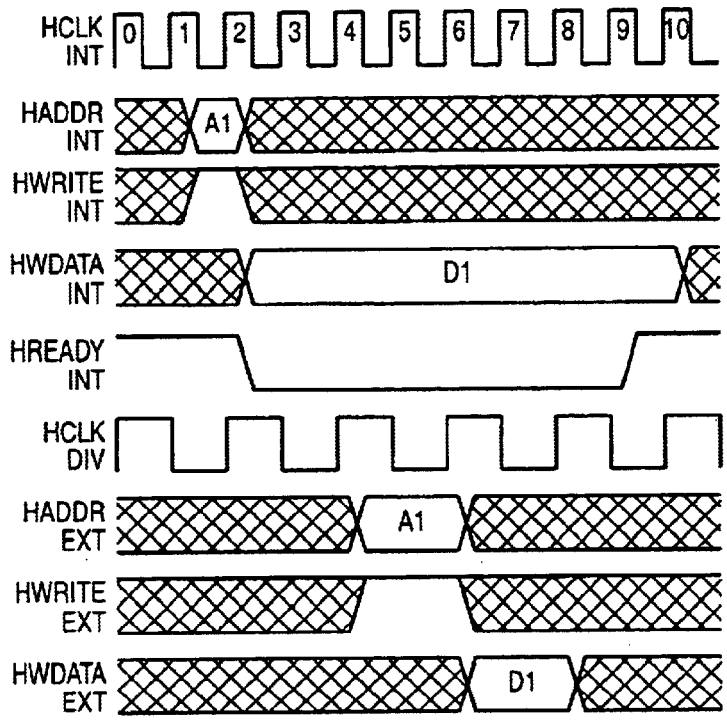
FIG._4
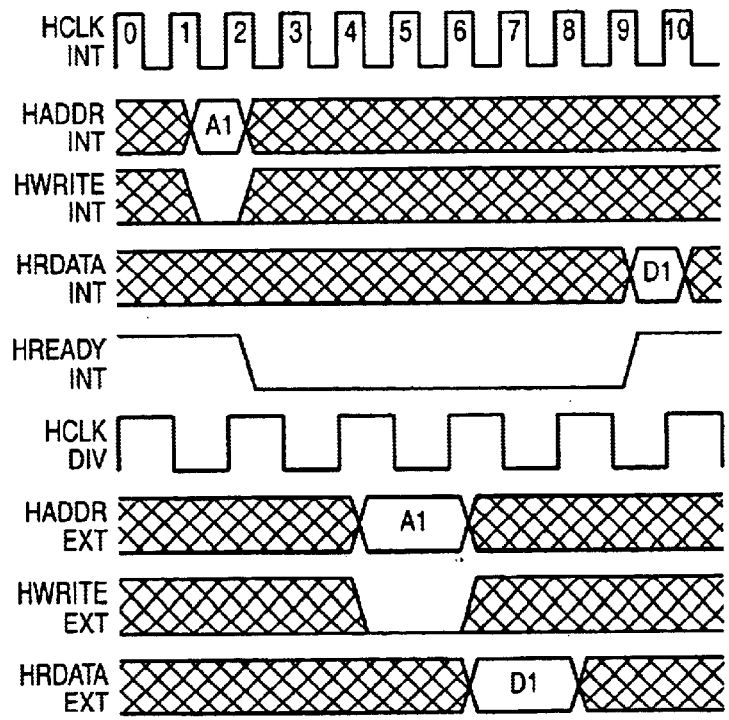
FIG._5

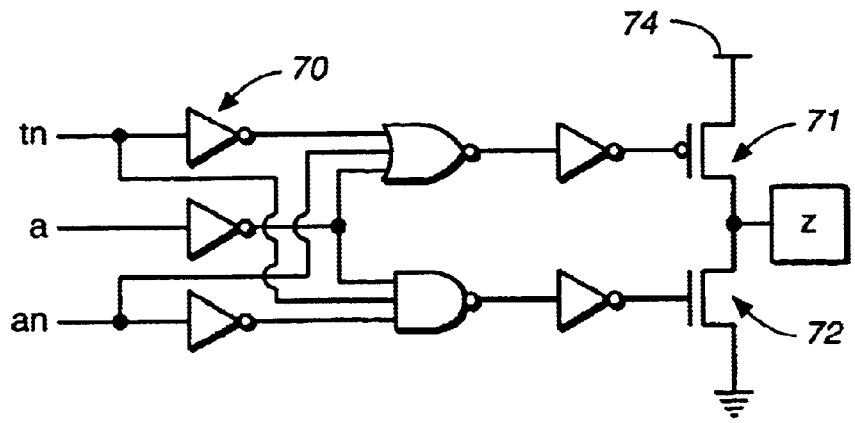
FIG._6
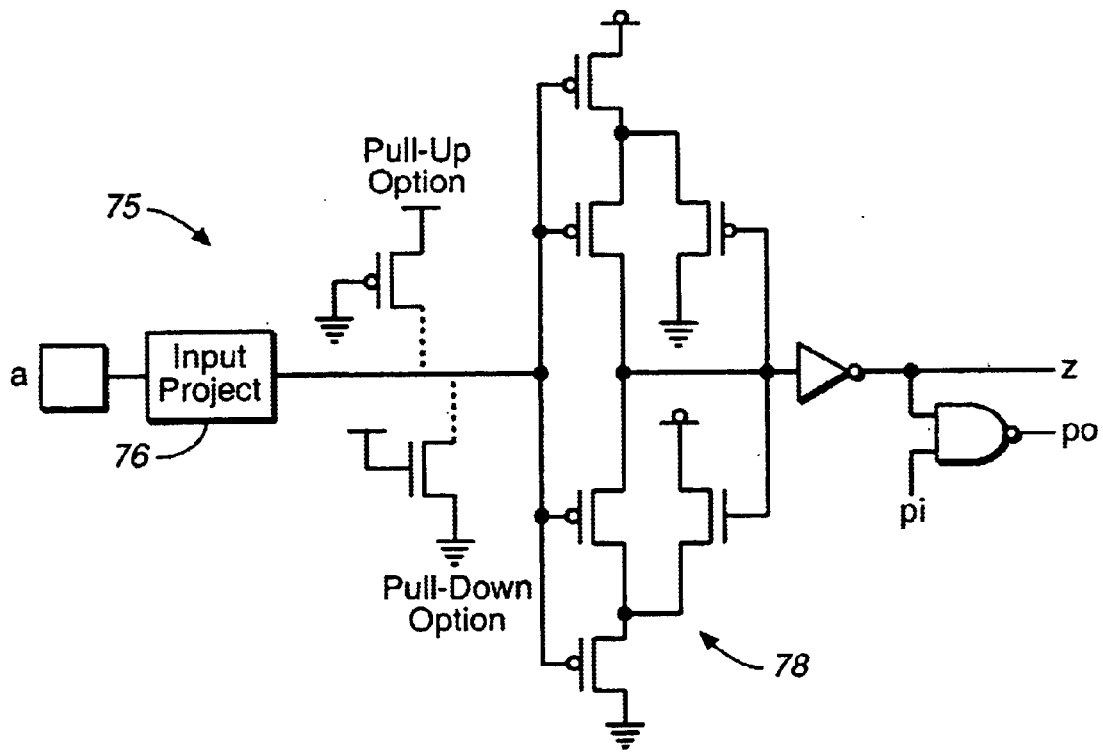
FIG._7

US 6,810,460 B1

AMBA BUS OFF-CHIP BRIDGE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

The present invention relates to application specific integrated circuits ("ASICs") operating with Advanced Microcontroller Bus Architecture ("AMBA"), and more particularly to an application specific integrated circuit having an on-chip bridge for connection to off-chip devices.

As their name implies, application specific integrated circuits, or ASICs, are essentially integrated circuits implemented on a chip designed for a specific use or application. ASICs are used for numerous applications. For instance, ASICs are used for machine-to-machine communications for the space shuttle, for DVD processing, for advanced digital signal processing, for trans-oceanic cables, etc. Such special purpose processors can be embedded in essentially any equipment to enhance and control its functions.

Typically an ASIC includes one or more core processors, memory and other functional devices on a single semiconductor chip. Having the devices on the same chip allows data to be easily and quickly transferred between the various devices on the chip. To accommodate high speed data transfers on a chip, specialized bus protocols have been developed specifically for this purpose. For example, ARM Limited, a company specializing in the design of processor cores, has developed one such protocol known as the Advanced Microcontroller Bus Architecture, or AMBA. AMBA includes the Advanced High-performance Bus, or AHB, which provides for high-speed transfers of data between various components on a chip.

As one might expect, development of an ASIC is a complicated and expensive process. Once a design has been completed to the point of actual production of a new device, i.e. putting the design on silicon, it is often too late to make changes. Any corrections or additions of new functions essentially require a new design and are therefore very expensive.

It is common, however, for customers to request the addition of new functions to existing ASICs. To assist in redesigning an ASIC to meet these requests, it would be very desirable to have the capability of connecting an external device to the ASIC with the new or additional function for testing purposes. Allowing external testing of proposed redesigns would greatly reduce work and time to implement additions to an ASIC versus having to produce ASICs incorporating the proposed redesigns on the chip. Moreover, in some cases, it may be more cost effective to improve an existing ASIC by simply adding such an external device instead of redesigning the ASIC. To effectively do external testing or additions however, the external device would need to connect into the ASIC's system bus to exchange data. This can be a problem, however, because many external devices, for example field programmable gate arrays, do not operate at the speed of the ASIC's system bus, i.e. the AMBA AHB, and are therefore incompatible with the AMBA AHB.

BRIEF SUMMARY OF THE INVENTION

In accordance with the present invention, an ASIC is provided having an AMBA AHB and a bridge to provide a data transfer link to off-chip devices. The bridge includes a logic section and a buffer section. The logic section includes clock division and modification of control signals to allow the high speed AHB to communicate with a slower speed off-chip device or bus. The logic section also includes registers to hold signals being transferred by the bridge in order to accommodate differing clock rates. The buffer section provides conversion of signal voltage levels between the core voltages and the voltage levels required off-chip.

BRIEF DESCRIPTION OF THE DRAWINGS

FIG. 1 is a general block diagram of an application specific integrated circuit including a bridge and its connection to an off-chip bus and external device;

FIG. 2 is a more detailed block diagram of the logic section of the bridge;

FIG. 3 is a flow chart illustrating the functions of the State Machine shown in FIG. 2;

FIG. 4 is a timing diagram illustrating the function of the apparatus shown in FIGS. 1, 2 and 3 in a write cycle;

FIG. 5 is a timing diagram illustrating the function of the apparatus shown in FIGS. 1, 2 and 3 in a read cycle;

FIG. 6 is a diagram of an output buffer; and,

FIG. 7 is a diagram of an input buffer.

DETAILED DESCRIPTION OF THE INVENTION

With reference to FIG. 1, the overall structure of an ASIC according to the present invention will be described. The ASIC comprises all of the elements shown within the dashed line 10, all of which reside on a single semiconductor chip. It includes a processing core or CPU 12, an arbiter 14, a signal multiplexor 16, and other functional components 18. These components are coupled through an internal or on-chip bus 20. In this case, the chip bus 20 is the AMBA AHB. In order to connect the chip bus 20 to off-chip components, a bridge section 22 is provided. Bridge 22 includes a logic section 24 and a buffer section 26. The logic section 24 performs the necessary logical changes to the chip bus 20 signals as they pass between the ASIC and the off-chip device 30. The buffer 26 changes the electrical characteristics of the control signals and data as they pass between the ASIC and the off-chip device 30. An input/output, or I/O, bus 28 is provided for coupling signals from the bridge 22 to an off-chip device 30. Device 30 may be, for example, a field programmable gate array ("FPGA").

With reference to FIG. 2, the structure of the logic section 24 will be described in more detail. This section modifies and couples a number of AMBA AHB signals between the chip bus 20 and the off-chip device 30. These signals are defined by the AMBA specification as follows. In the AMBA, all names of signals on the AHB begin with an "H" and active low signals are indicated by an "n" at the end of the signal name.

HCLK is the AHB clock which times all AHB transfers. All signal timings are related to the rising edge of HCLK.

HRESETn is the AHB reset signal used to reset the system and the AHB. It is an active low signal.

HREADY is generated by a slave device to indicate that a transfer has finished on the bus. This signal may be driven low to extend a transfer.

HBUSREQx are generated by the bus masters, including CPU 12. They are signals to the arbiter which indicate that the master requires use of the bus. Each bus master has its own request signal with the "x" being a number which identifies the master.

HGRANTx is a signal generated by the arbiter. It indicates that the bus master "x" which requested the bus has access to the bus.

HTRANS[1:0] is a signal generated by the bus master. It indicates the type of the current transfer, which can be nonsequential, sequential, idle or busy.

The logic section 24 includes configuration registers 32 for storing variables which identify the logical changes which are needed for modifying the logic signals being transferred from the ASIC 10 to the off-chip device 30. For example, the clock speed of off-chip device 30, or the ratio of AHB clock speed to off-chip bus clock speed, must be provided to a clock divider 34. With this information, the divider 34 can convert the HCLK signal to an HCLKDIV signal at a slower speed for operation of data transfers over I/O bus 28. Registers 36 provide temporary storage of data being transferred between chip bus 20 and I/O bus 28 to accommodate different clock speeds on each bus.

Ready control logic 38 modifies the HREADY signal from the off-chip device 30 to account for the slower signal speed of the I/O bus 28. As noted in the definitions above, by driving this signal low, the transfer time is extended to provide more time for the off-chip device to complete a data transfer to the faster chip bus 20. For example, if the CPU 12 issues a read command to device 30, the HREADY signal is held low until the device 30 has sufficient time to actually drive the requested data onto I/O bus 28 and registers 36. As long as the HREADY signal going back to CPU 12 is low, it will wait and is effectively slowed to the speed of the I/O bus 28. When the HREADY signal goes high, the CPU 12 will read the data on the bus.

Reset control logic 40 is provided to control the HRESETn signal to the off-chip device 30. In normal operation, it merely couples the HRESETn signal to the output line 42 which connects to the reset input of off-chip device 30. In addition, it provides a logic low on line 42 until the configuration registers 32 have been programmed by the CPU 12 or by manual setting of switches, etc. This prevents the off-chip device 30 from trying to make transfers to the chip bus 20 until the logic section 24 is ready to handle such transfers.

Bus access control logic unit 44 produces modified versions of the HBUSREQx signal from line 46 and the HGRANTx signal to line 48, which are coupled to the off-chip device 30. If the I/O bus 28 is operating at the same speed as the chip bus 20, these signals are passed through without modification. But, if the clock speeds are different, the HBUSREQx signal to the arbiter must be held at a logic low, because off-chip masters cannot be used unless the clock speeds are the same. By holding the HBUSREQx signal low, a slow off-chip device is prevented from requesting use of the chip bus 20. The HGRANTx signal to the off-chip devices is also held low under these conditions to prevent the off-chip device from trying to perform a transfer to or from the chip bus 20.

A state machine 50 tracks the state of data transfer transactions between chip bus 20 and I/O bus 28. It provides control signals to the registers 36 and ready logic 38. State machine 50 is described in more detail below with reference to FIG. 3.

FIG. 3 is a flow chart illustrating the functions of state machine 50. Step 52 represents the starting point of the state machine functions. This step is activated at start up of the system and when the HRESETn signal is deasserted. At step 54, the state machine 50 determines the operating mode based on the relative speeds of the clocks on-chip bus 20 and I/O bus 28. As noted above, the bus clock speed information is written into the configuration registers 32 as part of setting up the system. The state machine 50 uses this information at step 54 to determine whether the clock speeds on-chip bus 20 and I/O bus 28 are the same or different.

If the clock speeds on-chip bus 20 and I/O bus 28 are the same as indicated at step 56, the state machine 50 and logic section 24 become essentially inactive. When the clock speeds are the same, all of the AHB signals are simply passed through the logic section 24 without change or delay. This includes the address and data signals on chip bus 20 which are coupled through registers 36 in real time or at full speed without delay. Likewise the HREADY signal is not modified by ready control logic 38, since no delay is needed when the off-chip device operates at on-chip bus speed.

If the clock speeds on chip bus 20 and I/O bus 28 are different as indicated at step 58, the state machine 50 interfaces with registers 36 and ready control logic 38 to control transfers of data between chip bus 20 and I/O bus 28. At step 60, the state machine 50 waits for a bus cycle to start. When the master calls for a bus transfer, either read or write, it asserts the HBUSREQx signal and sets the HTRANS signal for the appropriate type of transfer. The state machine 50 receives the HBUSREQx and HTRANS signals and recognizes the start of a bus cycle. At step 62 the state machine compares the address on chip bus 20 to the allowable addresses of off-chip device 30. The allowable address range may be stored in configuration registers 32. If the address does not match the allowable off-chip device addresses, the state machine returns to step 60 and waits for the next bus cycle to start.

If the address matches, then the state machine moves to step 64. At step 64, the state machine 50 causes registers 36 to load the data to be transferred and causes ready control logic 38 to deassert the HREADY signal being driven onto the chip bus 20. As noted above, this deassertion of HREADY allows the bridge to stall the master as needed to allow transfers of data to or from the slave 30 at the slower clock speed. When the data transfer is completed, the state machine 50 asserts the HREADY signal, as indicated at step 66. If the transfer was a burst type of transfer, and more data is to be transferred, the transaction may be incomplete as indicated at 68 and the state machine returns to step 64. If the last word of a burst has been transferred, or if only a single word was being transferred, the transaction is complete and as indicated at 69 the state machine returns to step 60.

With reference to FIG. 4, the function of the bridge 22 will be illustrated with reference to a timing diagram of signals involved in the process of writing a single word from the chip bus 20 to the I/O bus 28. In this figure, the AHB signal names are followed by either "INT" or "EXT" indicating that the signal appears on the chip bus 20 or on the I/O bus 28 respectively This timing diagram is for the case where the external clock is slower than, in this example one half the speed of, the internal clock.

The first signal shown in FIG. 4 is the HCLK INT signal which represents ten cycles of the clock used on chip bus 20. The HCLK DIV signal is the clock signal generated by the clock divider 34 of FIG. 2 to provide timing of transfers on the I/O bus 28. In this example HCLK DIV is at half the speed of HCLK INT, although it is not necessary that the clock speeds be related by an integer. In this example, the CPU 12 is writing a single word to the off-chip device 30. It starts the process by asserting an address A1 on the HADDR INT control signal during cycle one of HCLK INT and by, at the same time, driving the HWRITE INT signal to a logical one level to indicate that it is a write cycle. As indicated in FIG. 3, the state machine 50 recognizes the address as a valid address for the off-chip device 30 and deasserts the HREADY INT signal at the same time that the CPU 12 drives the data word D1 onto the HWDATA INT bus lines. As indicated, the word D1 is maintained on the chip bus 20 until the HREADY signal is asserted, which process is used by the bridge 22 to be sure the off-chip device 30 has sufficient time to receive the word D1. During cycles four and five of HCLK INT the bridge 22 sends the address A1 onto the HADDR EXT signal line and at the same time drives the HWRITE EXT signal to a logical one to instruct the off-chip device 30 that this is a write cycle. During cycles six and seven of HCLK INT, the bridge 22 places the data word D1 on the HWDATA EXT bus lines and the off-chip device 30 reads the data. Note that in this example of a two to one ratio of clock speeds, the address A1 and the data D1 are driven on the I/O bus 28 for one cycle of the external clock, HCLK DIV, which corresponds to two cycles of the internal clock, HCLK INT. After the off-chip device has read the data, the HREADY INT signal is asserted so that the CPU 12 and chip bus 20 are released and can proceed with its next transaction.

In FIG. 5 the states of the signals shown in FIG. 4 are shown for the case of reading a single word from the off-chip device 30 to the CPU 12. At cycle one of HCLK INT the CPU 12 drives address A1 onto the HADDR INT bus lines and at the same time drives the HWRITE INT signal to a logical zero to indicate that it wants to read the data stored at the address A1. On recognizing that A1 is a valid address, the bridge 22 deasserts the HREADY INT control signal. During cycles four and five of HCLK INT, the bridge places the address A1 on the HADDR EXT bus lines and drives the HWRITE EXT control signal low to instruct the off-chip device 30 to provide the data word D1 on the HRDATA EXT lines of I/O bus 28, which it does on the next cycle of HCLK DIV. Having received data word D1 from off-chip device 30 and stored the word D1 in registers 36, the bridge 22 asserts the HREADY INT signal and drives the data D1 onto the HRDATA INT bus where the CPU 12 will read the word on the positive transition at the end of cycle nine of HCLK INT.

As noted above, the AHB provides for burst transfers of data as well as for transfers of single words as illustrated in FIGS. 4 and 5. One way to accommodate such burst transfers in bridge 22 is to use shift registers with sufficient depth to accommodate the desired burst length for registers 36. This would speed burst write cycles by allowing the CPU 12 to transfer the entire burst into the registers 36 at its internal clock speed. Under these circumstances, the HREADY INT signal can remain asserted because the registers can accept the data at the same speed as the CPU 12 drives it on the AHB. The HREADY INT signal would be deasserted if the registers are not available to receive data, e.g. if the CPU calls for another write cycle before the data in the registers can be loaded by the off-chip device 30. This method of operation allows the CPU 12 to proceed with other transactions while the off-chip device 30 reads the data from the bridge 10 at its slower external clock speed.

FIGS. 6 and 7 illustrate output and input buffer circuitry suitable for use in the buffer section 26 of the bridge 22 as shown in FIG. 1. In the preferred embodiment, the I/O bus 28 includes separate read and write busses. A bidirectional arrangement could of course be substituted if desired. FIG. 6 illustrates an output buffer 70 for output lines from chip 10. Each output line, including data, address, controls, etc. needs an output buffer for converting voltages from the internal chip levels to the off-chip bus signal levels and to provide sufficient power to drive the off-chip conductors. In FIG. 6, the signal line labeled "a" is connected to a line from logic section 24 which resides on the chip 10. These on-chip lines and the inverters and gates shown in FIG. 6 operate at low voltage, such as 1.8 volts for 0.18 micron silicon processes. Off-chip devices normally operate at voltages of 3.3 or 5 volts. The output of the buffer 70 is labeled "z" and is driven by transistors 71 and 72. The required off-chip voltage, e.g. 5 volts, is supplied to input 74 so that the output transistors can drive the voltage levels required by the I/O bus 28 and device 30.

FIG. 7 shows a Schmitt-Triggered input buffer 75. The input labeled "a" is connected to an input line from I/O bus 28. The output labeled "z" is connected to an input to logic section 24. The input buffer 75 includes input protection 76 and transistors 78 for converting the input voltage levels to the on-chip voltage levels. Each input signal to buffer section 26 would require this type of circuit for providing input protection and voltage level conversion between the chip 10 and the off-chip device 30 or I/O bus 28.

While the present invention has been illustrated and described in terms of particular apparatus and methods of use, it is apparent that equivalent parts may be substituted of those shown and other changes can be made within the scope of the present invention as defined by the appended claims.

What I claim as my invention is:

1. An application specific integrated circuit comprising:

a processor:

an internal bus coupling signals to and from the processor at a first clock frequency, the internal bus comprising an Advanced Microcontroller Bus Architecture Advanced High-performance Bus;

a bridge coupling signals from said internal bus to an off-chip device operating at a second clock frequency, the second clock frequency being slower than the first clock frequency, said bridge comprising a clock divider having an input receiving said first frequency and an output providing a clock signal at said second clock frequency, a register storing and coupling data between said internal bus and said off-chip device, and ready control logic modifying a HREADY signal to delay read and write cycles on said internal bus to accommodate data transfers on said off-chip device at said second clock frequency:

a configuration register storing a variable identifying said second frequency; and, reset control logic maintaining an HRESETn signal to said off-chip device in an active state until said configuration register is loaded with said variable.

2. An application specific integrated circuit comprising:

a processor;

an internal bus coupling signals to and from the processor at a first clock frequency, the internal bus comprising an Advanced Microcontroller Bus Architecture Advanced High-performance Bus;

a bridge coupling signals from said internal bus to an off-chip device operating at a second clock frequency, the second clock frequency being slower than the first clock frequency, said bridge comprising a clock divider having an input receiving said first frequency and an output providing a clock signal at said second clock frequency, a register storing and coupling data between said internal bus and said off-chip device, and ready control logic modifying a HREADY signal to delay read and write cycles on said internal bus to accommodate data transfers on said off-chip device at said second clock frequency;

a configuration register storing a variable identifying said second frequency; and, bus access control logic suppressing an HBUSREQ signal from said internal bus when said second frequency is different from said first frequency.

3. An application specific integrated circuit comprising:

a processor;

an internal bus coupling signals to and from the processor at a first clock frequency, the internal bus comprising an Advanced Microcontroller Bus Architecture Advanced High-performance Bus;

a bridge coupling signals from said internal bus to an off-chip device operating at a second clock frequency, the second clock frequency being slower than the first clock frequency, said bridge comprising a clock divider having an input receiving said first frequency and an output providing a clock signal at said second clock frequency, a register storing and coupling data between said internal bus and said off-chip device, and ready control logic modifying a HREADY signal to delay read and write cycles on said internal bus to accommodate data transfers on said off-chip device at said second clock frequency;

a configuration register storing a variable identifying said second frequency; and, bus access control logic suppressing an HBUSGRANT signal from said off-chip device when said second frequency is different from said first frequency.

* * * * *